Patented Nov. 16, 1948

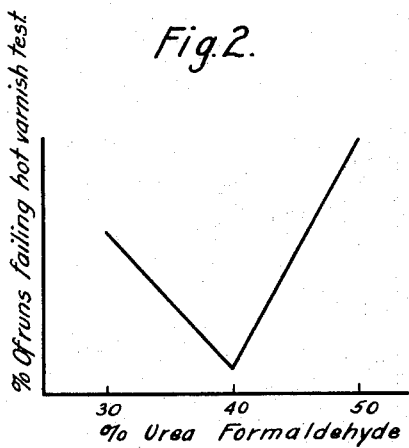
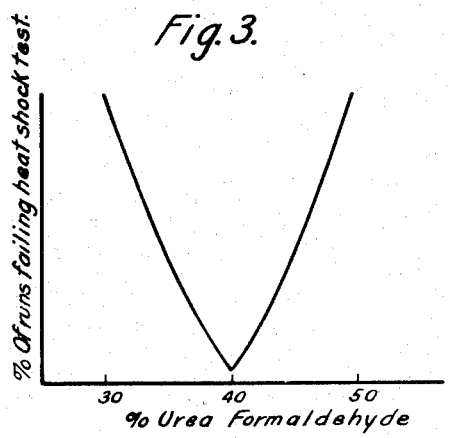
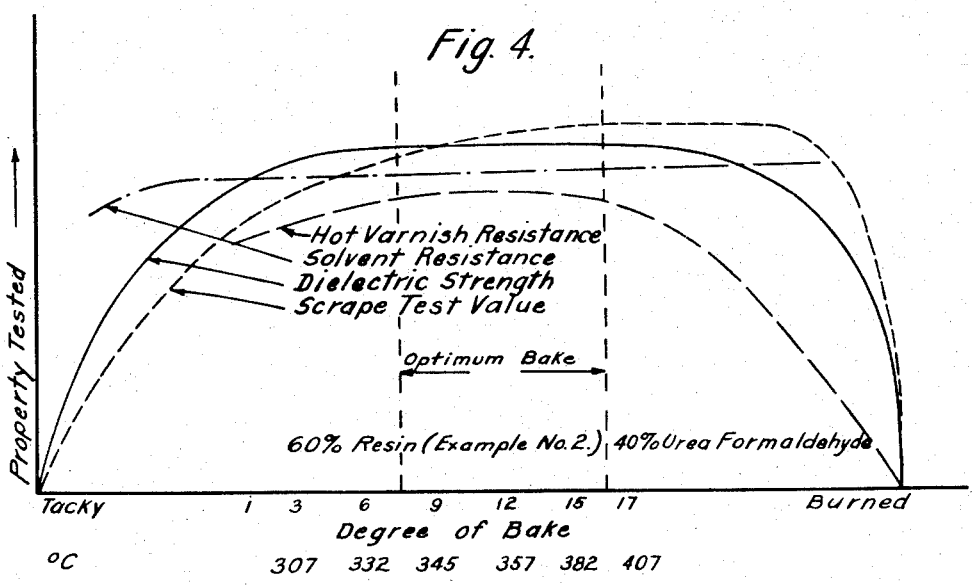

2,454,187

UNITED STATES PATENT OFFICE 2,454,187

UREA-FORMALDEHYDE-ALKYD INSULATING COMPOSITION

Charles B. Leape, Pittsburgh, and Frank A. Sattler, Wilkinsburg, Pa., assignors to Westinghouse Electric Corporation, East Pittsburgh, Pa., a corporation of Pennsylvania Application June 29, 1944, Serial No. 542,740

6 Claims. (Cl. 260—32.8)

This invention relates to an insulating composition, more particularly a wire enamel composition suitable for use in producing insulated electrical conductors. The invention further relates to the insulated conductors, especially enameled wire, produced by the use of the composition.

Large quantities of electrical conductor such as copper wire are electrically insulated by applying to the surface thereof organic finishes in the form of an enamel coating. The electrical industry employs enormous quantities of enameled wire of this kind in building electrical motors, coils, transformers and related apparatus. The life and service rendered by electrical apparatus employing the enameled wire conductor is dependent on the ability of the enamel coating to withstand the operating conditions and atmospheres to which the apparatus may be subjected. For example, electrical apparatus such as a motor may heat up to relatively high temperatures when overloaded or when employed in heated surroundings where cooling may be at a minimum. In other cases, the electrical apparatus may be subjected to moisture, such, for example, in the form of rain or inadvertent splashing and the like. Again, the electrical apparatus may be subjected to highly abrasive conditions which hold in cement mills and other manufacturing establishments. Corrosive gases may be present, for instance, in mines, chemical plants, and other manufacturing establishments. A great variety of conditions may be met with during which the enamel coating may be subjected to both mechanical and chemical deterioration whereby the effective life and service of the apparatus depends primarily upon the quality and nature of the applied enamel on the conductor.

Furthermore, enameled wire may be subjected to extremely rough usage at the time it is being applied to and incorporated in an electrical motor or other apparatus. In winding insulated wire in motor cores, for instance, the wire is often applied by means of automatic machines which stretch, twist and bend the wire severely. The wire may be subjected to forces which elongate the conductor metal 10% and more in length in this operation. Good enamel must stretch with the conductor without cracking. After the enameled wire has been applied to apparatus, it is a common practice in the art to impregnate the apparatus with impregnating varnishes. These varnishes are composed of resinous materials dissolved in any one or more of a variety of solvents, usually hydrocarbon liquids such as toluene and naphtha fractions. In the process of impregnation, elevated temperatures and reduced pressures may be employed in order to insure thorough penetration and to drive off the solvents from the treated apparatus and to harden the fresinous components of the varnish. Such conditions impose severe requirements to be met by enamel coatings. A good enamel coating should not dissolve, sleeve off the conductor or crack or otherwise significantly deteriorate.

A number of tests for enameled wire have been developed in the art in order to determine the characteristics of any enameled wire coating in order to evaluate its ability to meet the condtiions of manufacture and subsequent use. Thus various scrape and abrasion tests have been developed to indicate the relative toughness and hardness of an enamel coating. By means of these tests, it is possible to evaluate the ability of an enamel coating to withstand winding in contact with a relatively rough metal core slot, its resistance to pounding such as takes place when windings are compacted in slot cells of motors, and other mechanical abuse. The scrape test is particularly significant because it gives information on the fundamental property of mechanical toughness and strength. The test is usually performed by moving the enameled wire under a loaded knife edge, the load on the knife edge being increased until the enamel coating is scraped off the conductor. The weight in ounces required to reach the failure point of the coating is designated as the scrape value. In the evaluation of the present enamels, the scrape testing devices described in United States Patent No. 2,329,062 and the Leape et al. patent application Serial No. 467,736, filed December 3, 1942, now Patent 2,372,093, have been employed.

The dielectric strength of an enamel coating is a highly important feature. At the present time a minimum of 1500 volts per mil thickness of coating is desirable.

Another test is made to determine the solvent resistance of the enamel by immersing samples in both alcohol and toluene and determining the change in scrape value. In many cases a wire enamel otherwise having good characteristics deteriorates to such an extent after being immersed in either of these common solvents that it possesses substantially no mechanical strength. Therefore, the enamel would be unsatisfactory for impregnation in varnishes using either of these solvents.

The so-called jerk test is applied to determine the ability of an enamel coating on wire to withstand such severe uses as in coil winding machines. In this test, a length of enameled wire is elongated up to 30%, for example, by a sudden jerk applied thereto and the resulting condition of the enamel coating is determined. If the coating is uncracked and continuous after the jerk test, it is deemed satisfactory.

A particular test to determine the ability of a given enamel coating to withstand baking temperatures is the "heat shock test." In this test, the insulated conductor is coiled about a predetermined size mandrel and heated in an oven to a temperature of about 125° C. Many wire enamels, when cooled from this temperature, will be found to have cracked or crazed badly.

A rather severe test is the "hot varnish test" performed by immersion of the enameled wire for at least 20 hours in impregnating varnish at a temperature of 125° C. After the test, the scrape value of the enameled wire is made to determine the mechanical toughness and hardness as compared to its original value. A poor enamel coating will sleeve, that is, become completely non-adherent, or its scrape strength may become negligible.

Since many electrical motors are employed in contact with refrigerants, a desirable characteristic of a high-grade wire enamel is a complete inertness to the usual refrigerants, with or without lubricating oil therein. The refrigerant is generally heated during the test in order to simulate the most severe conditions of operation. In liquid dielectric cooled transformers and other apparatus, the insulated wire is subject to the action of hot dielectric liquids such, for example, as oil or chlorinated and/or fluorinated hydrocarbons. A test to determine whether or not the enameled wire is suitable for this use is made by immersing it in the hot dielectric liquid for prolonged periods of time and then measuring the change in its mechanical properties, such as scrape value. A good enamel will have changed very little after the test.

From the standpoint of manufacturing the criteria of a good wire enamel are its ease of application to copper wire, and the baking conditions required to achieve a satisfactory enamel coating.

Some enamel compositions must be baked within an extremely narrow range to obtain the optimum properties. The care and control required may be impractical, since large amounts of waste may be produced by small inadvertent changes in conditions of baking. Changes in size of the wire being enameled, for example, may require considerable changes in the temperature and speed of travel through a baking tower. A desirable characteristic of a commercially satisfactory wire enamel composition is the attainment of a satisfactory cured condition over a relatively wide range of baking temperatures.

In some cases, it has been found to be commercially desirable to produce different degrees of coloration of the applied enamel on wire by changing the baking temperatures. In general, a low baking temperature results in a light golden colored enamel coating closely similar in color to that of the copper wire itself, while with higher baking temperatures the color becomes progressively redder, and a dark mahogany or black is reached at maximum baking temperatures. In order to satisfy the requirements of the trade, it is desirable that the enamel be of a satisfactory chemical and mechanical condition even though it may be baked to attain any given color, that is, from a golden to a black.

It will be appreciated that wire enamel compositions may be prepared, without excessive effort, that will exhibit high values as to one or even several of the critical properties desired in a good enamel, but some other property or properties will be so poor that such composition would not be considered satisfactory for commercial use. Those skilled in the art are well acquainted with the extraordinary difficulties involved in producing a wire enamel of which all the properties are better than fair.

The object of this invention is to provide a resinous composition suitable for application to electrical conductors which on treatment results in an enamel coating having good insulation characteristics and mechanical strength.

A further object of the invention is to provide enamel composition for application to electrical conductors which is copolymerizable over a wide range of baking temperatures to provide for a predetermined color.

A still further object of the invention is to provide an organic coating on electrical conductors capable of successfully meeting the recognized tests as herein described to determine the mechanical and chemical characteristics of enameled wire.

Other objects of the invention will, in part, be obvious and will, in part, appear hereinafter. For a further understanding of the nature and objects of the invention reference should be had to the following detailed drawings of the invention in which:

Figure 1 is a cross section through an insulated conductor.

Fig. 2 is a chart of heat varnish failures plotted against composition.

Fig. 3 is a chart plotting heat shock failures against composition, and

Fig. 4 is a chart plotting the properties of a wire enamel against baking temperatures.

According to the present invention, organic compositions highly satisfactory for use as wire enamel coatings are derived from a copolymerizable combination of urea-formaldehyde resin and a polyester alkyd resin. We have found that this composition when baked on conductors exhibits the highest degree of hardness, toughness, and flexibility with respect to mechanical requirements and has such outstanding chemical resistance that it is almost completely unaffected by various solvents, such as alcohols and toluene, hot varnish, oils, and halogenated hydrocarbons.

The proportions of the composition are somewhat critical in order to attain the optimum values of the required characteristics. In particular the proportion of urea-formaldehyde should be within the limits of about 30% to 60% with the alkyd resin comprising the remainder. When the composition is outside these proportions, the properties are rather unsatisfactory.

As is well known in the art of applying enamel to wire, the composition, viscosity of the enamel and other factors may require slight changes as different size wire is being treated. For example, a composition having 40% urea-formaldehyde gave excellent results on No. 20 wire, whereas 45% to 50% urea-formaldehyde content gave slightly better results on No. 26 wire than a 40% urea-formaldehyde composition.

A typical urea-formaldehyde resin suitable for the practice of this invention is the reaction product of 1 mol of urea with 2 mols of formaldehyde. The preparation of urea-formaldehyde resin is well known and need not be detailed herewith. For use in preparing the composition, the clarified and dehydrated urea-formaldehyde in the solvent soluble stage or the A-stage is dissolved in suitable solvents therefor. A typical solvent is composed of 40% xylol and 60% butanol. A 50% solids content solution is satisfactory for use. Another solvent is composed of a mixture of 100 cc. ethyl alcohol, 84 cc. N butyl alcohol, 14 cc. ethyl lactate, and 5 to 10 grams of salicylic acid. Approximately 100 grams of A-stage urea-formaldehyde resin may be dissolved in the latter mixture.

Urea reacted with polymers of formaldehyde, such as paraformaldehyde, and other aldehydes may be employed in preparing a wire enamel. The degree of condensation of the urea-aldehyde resin as well as the proportions of urea to aldehyde, the presence of plasticizers and other substances commonly added to impart predetermined characteristics, and corresponding changes of the urea-aldehyde resin are to be considered, in combining it with the alkyl polyester resin.

The alkyd resin employed in the present wire enamel is composed of a mixture of an aliphatic unsaturated alpha-beta dicarboxylic acid or its anhydride, such as maleic anhydride, and succinic acid. The succinic acid should be less in molar amount than the mols of ethylene alpha-beta dicarboxylic acid. A mixture of a dihydric alcohol and glycerol providing approximately the same total number of hydroxyl groups as the carboxyl groups in the mixture of acids is used in the reaction. The ratio of mols of dihydric alcohol to the glycerol may vary from 1:1 to 6:1.

From tests made with many alkyd polyesters, it has been found that glycerol is apparently a necessary ingredient, since it appears to provide for compatibility of the alkyd resin with the urea-formaldehyde resin. The chain length of succinic acid appears to impart the most desirable characteristics from a mechanical strength standpoint. For example, the substitution of adipic acid in Example I for the succinic acid causes failure in the heat shock test and diminishes the scrape value and alcohol resistance as well.

In producing the alkyd polyester resin the mixture of acids and the alcohols are reacted in a closed reaction vessel equipped with a stirrer, a trap and a gas inlet to provide for an inert atmosphere free of oxygen. The reactants are heated rapidly to about 150° C. and the temperature is then more gradually raised to a temperature of about 190° C. Water is collected in the trap as the reaction proceeds. The reaction is continued for approximately 3 to 6 hours to an acid number of from about 75 to 140. The reaction mixture produced is diluted with diacetone alcohol or other solvent, while hot, to a 50% solids content solution.

A wire enamel solution may be prepared by mixing a 50% urea-formaldehyde solution, for instance, with a 50% alkyd solution in the proportion of 60% of the alkyd solution to 40% of the urea-aldehyde solution. In some cases, to produce a suitably viscous wire enamel, the mixture may be diluted with a mutual solvent, which, for example, may be a chlorinated ethane. A solution having a solids content of from 15% to 30% is suitable for use in most wire enamel machines. If enamel coating dies are employed a more viscous solution having a higher solids content may be employed, for example, a 50% solids content.

The wire enamel so prepared may be applied by flowing, or by a dipping process or other suitable method of applying the enamel solution to a copper conductor. To drive off the solvent and to cure or copolymerize the alkyd resin with the urea-formaldehyde resin, the coated wire is heat-treated or baked. The baking temperatures may be varied within a wide range, since for most satisfactory application the temperature must be correlated with the speed of the wire through the enameling tower as well as the size of the tower. In a small high-speed tower, a temperature of approximately 450° C. may be satisfactory, while in a large tower with slower wire travel speeds a temperature of 250° C. or higher may be suitable.

Referring to Fig. 1 of the drawing, there is illustrated an electrical conductor 10 carrying a coating 12 of the heat-treated alkyd-urea aldehyde resin of this invention. It is believed that a copolymer of the urea-formaldehyde and the alkyd resin is produced. However, we do not subscribe to any particular explanation of the actual reaction. The properties of the conductor shown in Fig. 1 have been compared with a number of compositions known in the prior art and the mechanical and chemical characteristics have been found equal to or superior to those of any known composition available on the market today.

Referring to Fig. 2 of the drawing, there is illustrated therein the critical relationship of proportion of urea-formaldehyde to a given alkyd resin for a given size of copper wire. At approximately 40% urea-formaldehyde a negligible percentage of the tests fail when subjected to immersion for 20 hours in varnish heated to 125° C. Fig. 3 is a second curve for the same combination of resins as in Fig. 2 showing that a critical minimum failure on heat shock is reached when 40% urea-foraldehyde is employed. Therefore the 40% urea-formaldehyde resin content appears to produce the best enamel. The composition on which the tests shown in Figs. 2 and 3 were determined was prepared from an alkyd polyester produced by reacting the following:

EXAMPLE I

|  | Mols |
|---|---|
| Maleic anhydride | 6.10 |
| Succinic acid | 1.82 |
| Ethylene glycol | 4.43 |
| Glycerol | 2.32 |

After three hours reaction at a temperature of from 150° C. to 190° C., the acid number of the reacted polyester was approximately 130. The polyester was dissolved in diacetone alcohol. A wire enamel prepared with 40% urea-formaldehyde resin and 60% of this polyester had excellent overall properties when applied to copper wire and tested as herein described.

A wire enamel composition having a wider baking range than that of Example I was prepared by reacting the following:

EXAMPLE II

|  | Mols |
|---|---|
| Maleic anhydride | 5.28 |
| Succinic acid | 2.64 |
| Ethylene glycol | 5.91 |
| Glycerol | 1.34 |

This polyester was reacted to an acid number of from 75 to 90. A wire enamel produced by combining 60% of the resin of Example II and 40% of urea-formaldehyde resin was tested to determine the change in the four most critical properties with respect to variation in baking temperature. These values are plotted in Fig. 4. It is believed that the characteristics of the wire enamel shown in Fig. 4 indicate the greatest latitude in baking known for any wire enamel. The relatively flat values over the optimum range of baking temperatures shown make it possible to attain any desired color in the applied enamel coating by predetermined baking temperature without entailing a sacrifice in some property.

The numbers used as the abscissa in Fig. 4 were established by means of a standard chart made by selecting samples of enameled wire baked at close intervals over a range of temperatures, thus producing coatings of varying degrees of color. The colors are uniformly and progressively darker from 1—which is practically transparent and of a copper color—to 16—which is a dark mahogany. Thus, by baking to the 17 figure, an almost black enamel is obtained. At the 6 value a light orange to golden enamel coating is produced on copper wire. Intermediate colors are obtained between these two values by appropriate baking conditions.

A large number of enamel compositions were prepared according to this invention and were tested for dielectric strength. When applied to copper wire and baked all the enamel coatings tested above 2000 volts per mil. Compositions embodying the alkyd polyesters of Examples 1 and 2, often gave dielectric strength values of 3500 volts per mil.

It was also found that whereas some enameled wire coatings deteriorate on standing for long periods of time, the wire enamel coatings of alkyd polyester and urea-formaldehyde actually improve in some properties on ageing for six months or longer. Therefore, the shelf life or storage is excellent.

The hardness and toughness of the enamel coatings on wire may be said to be roughly at least three times that of the tung oil enamels used by the prior art.

Indicative of the improvement of the present composition over prior art enamels is the following table of comparative values, all made on a given size copper wire:

the enamels of the present invention may be prepared with flexibilizing and plasticizing substances, such, for example, as oils, waxes and long chain organic compounds commonly applied in a combination with wire enamels.

Since certain changes may be made in the above invention and different embodiments of the invention could be made without departing from the scope thereof, it is intended that all matter contained in the above description or taken in connection with the accompanying drawings shall be interpreted as illustrative and not in a limiting sense.

We claim as our invention:

1. A resinous composition composed of, in combination, from 30% to 60% by weight of partially reacted, thermosetting urea-formaldehyde resin, and from 70% to 40% by weight of the partial resinous polyester alkyd reaction product compound of an acidic mixture of maleic anhydride and succinic acid, the mols of maleic anhydride being more than, but not exceeding substantially 3.35 times, the mols of succinic acid, and a mixture of glycerol and ethylene glycol in a molar ratio of from 1:1 to 1:6, the mixture of ethylene glycol and glycerol providing substantially two hydroxyl groups for each molecule of acidic mixture, the alkyd reaction product having an acid number between 75 and 140.

2. A resinous composition suitable for application to conductors as a wire enamel comprising, in combination, from 30% to 60% by weight of partially reacted, thermosetting urea-formaldehyde resin, and the balance composed of the partial resinous reaction product of 5.28 mols maleic anhydride, 2.64 mols succinic acid, 5.91 mols ethylene glycol and 1.34 mols glycerol, the reaction product having an acid number of between 75 and 140.

3. A resinous composition suitable for application to conductors as a wire enamel comprising, in combination from 30% to 60% by weight of partially reacted, thermosetting urea-formaldehyde resin, and the balance composed of the partial resinous reaction product of 6.1 mols maleic anhydride, 1.82 mols succinic acid, 4.43 mols ethylene glycol and 2.32 mols glycerol, the reac- Table

| Sample No. | Scrape | Jerk | Heat Shock | Solvent Resistance Scrape Values After 48 hours in— | | Hot Varnish | Scrape Value After Immersing 100° C. 67 Hrs. Halogenated Hydrocarbons |
|---|---|---|---|---|---|---|---|
| | | | | Alcohol | Toluol | | |
| (1) Tung Oil enamel | 15 | OK—Slight Cracks | Fails | 5 | 7 | Sleeves | 3 |
| (2) Polyvinyl resin enamel | 29 | OK | OK | 15 | 29 | OK—26 | 20 |
| (3) Example I Composition | 30 | OK | OK | 28 | 27 | OK—28 | 28 |
| (4) Example II Composition | 30 | OK | OK | 27 | 31 | OK—25 | 27 |

The compositions of this invention can be applied not only to bare copper wire, but they may be applied to cotton covered wire, asbestos covered wire, glass fiber covered wire and wire carrying other fibrous materials to provide for good electrical insulating coatings. The fibrous materials may be applied before or after the enamel is applied, or concurrently therewith, as desired.

It will be obvious to those skilled in the art that the solvents other than those indicated herein may be employed for producing a suitable wire enamel solution. The solvents may be selected by reason of availability and cost.

In order to provide for even greater flexibility to meet certain extreme mechanical requirements, tion product having an acid number of between 75 and 140.

4. An enamel suitable for applying to conductors comprising as the resinous component, from 30% to 50% by weight of partially reacted, thermosetting urea-formaldehyde resin and the balance composed of the partial resinous reaction product of 6.1 mols maleic anhydride, 1.82 mols succinic acid, 4.43 mols ethylene glycol and 2.32 mols glycerol, the reaction product having an acid number between 75 and 140, and a solvent for the resins composed of diacetone alcohol, butanol and xylol.

5. An electrical conductor provided with a hard, tough, flexible and solvent resistant coating comprising the heat-teated polymer product of from 30% to 50% by weight of partially reacted thermosetting urea-formaldehyde resin, and the balance composed of the partial resinous reaction product of 5.28 mols maleic anhydride, 2.64 mols succinic acid, 5.91 mols ethylene glycol and 1.34 mols glycerol, the reaction product having an acid number between 75 and 140.

6. An electrical conductor provided with a hard, tough, flexible and solvent resistant coating comprising the heat-treated polymer product of from 30% to 50% by weight of partially reacted, thermosetting urea-formaldehyde resin, and the balance composed of the partial resinous reaction product of 6.1 mols maleic anhydride, 1.82 mols succinic acid, 4.43 mols ethylene glycol and 2.32 mols glycerol, the reaction product having an acid number between 75 and 140.

CHARLES B. LEAPE.
FRANK A. SATTLER.

REFERENCES CITED

The following references are of record in the file of this patent:

UNITED STATES PATENTS

| Number | Name | Date |
|---|---|---|
| 2,195,362 | Ellis | Mar. 26, 1940 |
| 2,238,685 | Ellis | Apr. 15, 1941 |
| 2,255,313 | Ellis | Sept. 9, 1941 |

OTHER REFERENCES

"Synthetic Resins," pages 57 and 58, published 1944 by Resinous Products and Chemical Co., Phila., Pa.

Hodgins et al., pp. 7 and 8, "Paint, Oil and Chemical Review," June 22, 1939.